United States Patent [19]
Zweben et al.

[11] Patent Number: 5,768,586
[45] Date of Patent: Jun. 16, 1998

[54] NET CHANGE MANAGEMENT FOR OBJECT-ORIENTED MODELING

[75] Inventors: Monte Zweben, San Francisco; Michael J. Deale, Sunnyvale, both of Calif.

[73] Assignee: PeopleSoft, Inc., Pleasanton, Calif.

[21] Appl. No.: 372,047

[22] Filed: Jan. 10, 1995

[51] Int. Cl.[6] ................................................. G06F 3/14
[52] U.S. Cl. ................................................. 395/653
[58] Field of Search ................................. 395/651, 653

[56] References Cited

U.S. PATENT DOCUMENTS

| | | | |
|---|---|---|---|
| 5,237,497 | 8/1993 | Sitarski | 364/402 |
| 5,257,368 | 10/1993 | Benson et al. | |
| 5,276,877 | 1/1994 | Fredrich et al. | 395/653 |
| 5,477,474 | 12/1995 | Southgate et al. | 395/920 |
| 5,649,190 | 7/1997 | Sarif-Askary et al. | 395/612 |

*Primary Examiner*—Alvin E. Oberley
*Assistant Examiner*—John Q. Chavis
*Attorney, Agent, or Firm*—David R. Graham

[57] ABSTRACT

The invention facilitates modeling of an enterprise. A model developer uses a high-level modeling language to describe the enterprise with constructs that are more readily accessible to the model developer than those used in other previous modeling languages. The high-level description is translated into a low-level description that can more readily be used by a processing device to dynamically exercise the model. The constructs of the modeling language shield the model developer from many of the mundane tasks associated with maintaining data integrity in complex data structures. Of particular importance, the modeling language includes data constructs that make it easy to track and maintain data that changes during execution of a program, without considerable effort on the part of the model developer. These data constructs can be used to restore various states of the modeled enterprise during execution of the program, either automatically or at the direction of a user. The invention is particularly useful for modeling a complex enterprise, the operation of which is characterized by a large body of information. The invention can be used, for example, to develop a scheduling system for scheduling a complex activity and revising the schedule as necessary to accommodate changed circumstances. However, the invention is broadly applicable to modeling of any enterprise.

18 Claims, 6 Drawing Sheets

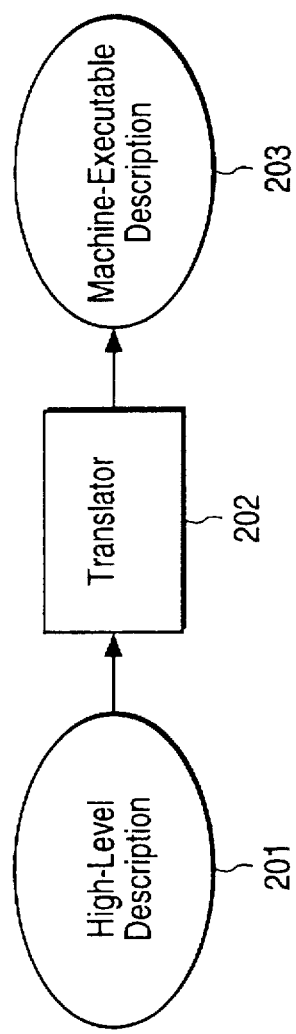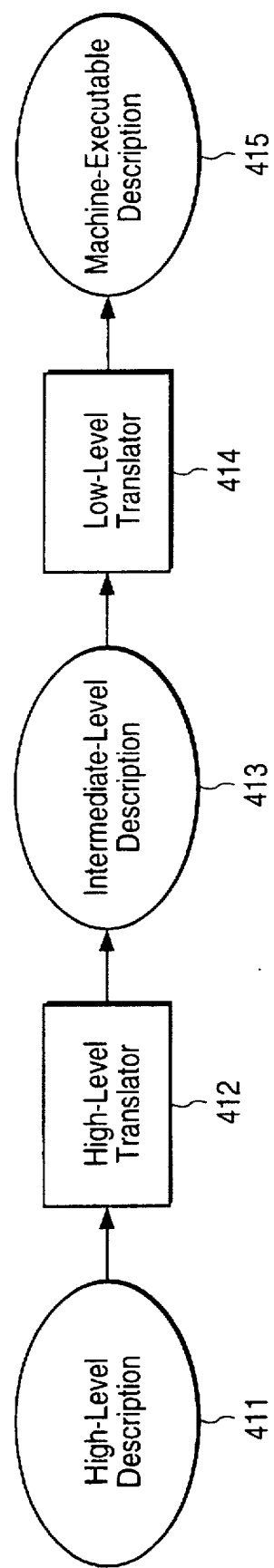

NET CHANGE MANAGEMENT FOR OBJECT-ORIENTED MODELING

BACKGROUND OF THE INVENTION

1. Field of the Invention

This invention relates to dynamic modeling of systems and processes and, in particular, to dynamic modeling of organizational systems and processes to enable analysis and control of the operation of the organizational systems and processes. Most particularly, the invention relates to a system and method for automatically tracking and maintaining information regarding changes in the state of a modeled system or process during dynamic operation of the model.

2. Related Art

Management of an organization requires management of the systems and processes (hereafter, "system" and "process" are referred to collectively as "enterprise") which define the organization's operation. Management of each organizational enterprise requires the management of information describing that organizational enterprise. For large organizations or for complicated enterprises, the amount of information that is required to adequately describe a particular organizational enterprise can be quite large. As a result, frequently it is desirable to develop a model of the organizational enterprise, implement that model on a computer, and use the computer model as an aid in managing the organizational enterprise. The computer model can then be used for a variety of purposes such as optimization of the configuration of the organizational enterprise for a set of predefined conditions or simulation of operation of the organizational enterprise for a variety of conditions.

Computer modeling can be used to aid in managing a wide variety of organizational enterprises such as, for instance, scheduling of an activity. For example, management of a complex activity, such as operation of a manufacturing facility, or maintenance and repair of a complex system such as the Space Shuttle, necessitates scheduling of many tasks which use a variety of resources. Development of a schedule that resolves the many possible conflicts that may arise during conduct of the activity is a complicated problem. Computer modeling is virtually a necessity to effectively cope with such scheduling problems.

However, even after a computer model is tested and implemented, changing circumstances, caused either by conditions within an organization or external to the organization, frequently necessitate that the computer model be revised. For instance, the scheduling problem is further compounded by the probability that unforeseen events will, from time to time, necessitate modification of any determined schedule. Thus, it is necessary to constantly maintain the computer model.

Traditional methods of developing a computer model for use in managing an organizational enterprise suffer from several deficiencies. First, development of a computer model using traditional methods requires a long time: many months or, perhaps, years. The development can take so long, in fact, that changed circumstances can make a computer model obsolete before it has been completed.

Typically, a computer model is developed by first specifying a description of the model in English, then translating the description into a language that a computer can understand, i.e., into a computer code such as C or Pascal. The complexity of writing and testing the computer code necessitates a large number of highly skilled personnel having specialized training (e.g., computer programmers) to accomplish these tasks, thus making development of a computer model very expensive. This complexity also contributes to making the development take a long time.

Moreover, even though highly trained and skilled personnel write and test the computer code, the complexity and relative inaccessibility of many computer languages causes the translation of the detailed specification into computer code to be a mistake-filled endeavor, and to require a large amount of code to model a given enterprise. The susceptibility of the code-writing process to errors and the large amount of code required cause both the initial development and the maintenance of a computer model to be an arduous task, again making the computer modeling expensive.

As might be expected, in traditional computer modeling methods, the personnel that write and test the computer code are typically different than the personnel (e.g., managers) that define and analyze high-level functions and develop the detailed English description of the organizational enterprise. Even these latter functions are often divided between two groups: high-level managers may define the high-level functions, while low or mid-level managers analyze the functions and develop the detailed description. In short, the complexity of traditional methods of developing a computer model stratifies the personnel charged with developing the model. This stratification often results in inefficiency and frustration on the part of the development personnel, since each segment of the development team is unable to adequately appreciate the nature of the work being performed by other segments. For example, the inaccessibility of typical computer languages used to implement computer models prohibits the managers who define the high-level functionality and develop the detailed description from participating intimately in the actual implementation of the computer model. Additionally, the specially trained personnel who develop the computer code generally lack understanding of the skills and knowledge required to define the high-level functionality and develop the detailed description. In sum, sharp division between system design and system implementation can lead to miscommunication between members of the development team that hinders successful development of the computer model.

Additionally, traditional computer languages used for modeling are deficient in a number of respects. For instance, as will be more readily apparent from the description of the invention below, it is desirable to be able to preserve various intermediate configurations of the organizational enterprise during dynamic modeling of the organizational enterprise. Frequently, it is not known that it is desirable to preserve an intermediate configuration until the configuration has been changed to some degree. Thus, the changes must be undone in order to recover the intermediate configuration. Traditional computer languages used for modeling require that computer code be written to account for the possibility that each change made in the configuration of the organizational enterprise may have to be undone. This requires that a large amount of code be added to the computer model. This code takes a long time to write, is highly likely to introduce errors into the computer model as well as have errors of its own, represents an additional item that the model developer must be concerned with implementing, and is difficult to maintain.

It would be desirable to develop a way of modeling an organizational enterprise (and other enterprises that require the management of large amounts of information) that overcome the above-described problems.

SUMMARY OF THE INVENTION

The invention facilitates dynamic modeling of a system or process (hereafter, "system" and "process" are referred to collectively as "enterprise"). For instance, the invention can be used to model an organizational enterprise to enable analysis and control of the operation of the organizational enterprise. A model developer uses a high-level modeling language according to the invention to describe the enterprise with constructs that are more readily accessible to the model developer than those used in other previous modeling languages. The high-level description is then translated into a corresponding low-level description that can more readily be used by a processing device to dynamically exercise the model to, for example, optimize or simulate operation of the enterprise for a specified set of conditions.

The constructs of the modeling language according to the invention shield the model developer from many of the mundane tasks associated with maintaining data integrity in complex data structures. Of particular importance, the modeling language includes data constructs that make it easy to track and maintain data that changes during execution of a program developed using the modeling language, without considerable effort on the part of the model developer. These data constructs can be used to restore various states of the modeled enterprise during execution of the program, either automatically or at the direction of a user, thus enabling a feature of the invention referred to as "net change management". Additionally, some of the data constructs of the modeling language enable tracking and maintenance of data histories representing aspects of the enterprise that change over time, enabling net change management of the data histories. Other procedural constructs provide a powerful mechanism for using the information contained within the data histories.

The invention is particularly useful for modeling a complex enterprise, the operation of which is characterized by a large body of information. The invention can be used, for example, to develop a scheduling system for scheduling a complex activity and revising the schedule as necessary to accommodate changed circumstances. However, the invention is broadly applicable to modeling of any enterprise.

According to one embodiment, the invention is used to dynamically model an enterprise. Each state of the enterprise is modeled by a set of configuration data. The modeled enterprise changes from an initial state to a final state.

In this embodiment, a set of configuration data representing the initial state is stored. A multiplicity of operations that change the state of the modeled enterprise are performed. For one or more of the operations, context data is generated and stored. The context data represents changes between a first set of configuration data and a second set of configuration data. The first set represents the state of the modeled enterprise at the beginning of the operation. The second set represents the state of the modeled enterprise at the end of the operation. After the operation is completed, the second set of configuration data is tested, using a set of predetermined conditions, to determine whether the second set of configuration data conforms to the predetermined conditions. If the second set of configuration data does not conform to the predetermined conditions, the first set of configuration data is restored using the context data and used as the current set of configuration data. If the second set of configuration data does conform to the predetermined conditions, then the second set of configuration data is accepted as the current set of configuration data. The set of configuration data that is current at the final state of the enterprise is the final set of configuration data and defines the final state of the enterprise.

According to another embodiment, the invention is again used to dynamically model an enterprise. Again, each state of the enterprise is modeled by a set of configuration data. The modeled enterprise changes from a first state to a second state, represented by first and second sets of configuration data, respectively.

In this embodiment, context data is stored that represents changes between the first set of configuration data and the second set of configuration data. The second set of configuration data is tested, using a set of predetermined conditions, to determine whether the second set of configuration data conforms to the predetermined conditions. If the second set of configuration data does not conform to the predetermined conditions, the first set of configuration data is restored using the context data. If the second set of configuration data does conform to the predetermined conditions, then the second set of configuration data is accepted.

As discussed above, the invention enables an enterprise to be described by a high-level modeling language. A developer can, therefore, provide a relatively short high-level description of the enterprise rather than a lengthy low-level description of the enterprise as is typically necessary with previous modeling approaches. As a result, the invention provides a number of advantages in modeling enterprises.

First, an enterprise can be modeled rapidly and easily, frequently enabling the modeling to be completed much more quickly than has been the case with previously used modeling techniques. Further, revisions to the model can also be made rapidly and easily, so that the model does not become obsolete as changed circumstances alter the characteristics of the modeled enterprise.

Further, because the developer-generated description of the enterprise is relatively short, relatively few man-hours are required to generate the description. The shortness of the description also means that fewer errors are likely to occur in the description; thus, "debugging" of the computer model also requires few man-hours. The shortness of the description also makes it easier to maintain and revise the description, again necessitating a low number of man-hours. In sum, the invention reduces labor costs involved in modeling the enterprise, thereby making such modeling cheaper.

Additionally, the simplicity of the high-level modeling language according to the invention enables modeling of the enterprise to be accomplished by a developer after a relatively small amount of training in use of the high-level language. Thus, the invention makes sophisticated and robust models available to a wide variety of people desiring to model their enterprise behavior.

The simplicity of the invention also makes the model and the modeling process more readily accessible to model developers that do not have extensive training in implementation of information systems. Consequently, there is reduced stratification among members of a team tasked with developing a model, thereby reducing the inefficiency and frustration that can result when various members of the development team are unable to adequately appreciate the nature of the work being performed by other members. The personnel of the development team are more fully integrated into the entire development process, enabling models to be obtained more quickly and efficiently, and, as a consequence, increasing the inclination to develop more robust models, thereby enhancing the effectiveness of the model as a tool.

BRIEF DESCRIPTION OF THE DRAWINGS

FIG. 2 is a block diagram illustrating operation of a system and method according to an embodiment of the invention.

FIG. 4 is a block diagram illustrating operation of a system and method according to another embodiment of the invention.

DETAILED DESCRIPTION OF EMBODIMENTS OF THE INVENTION

Figure 1:
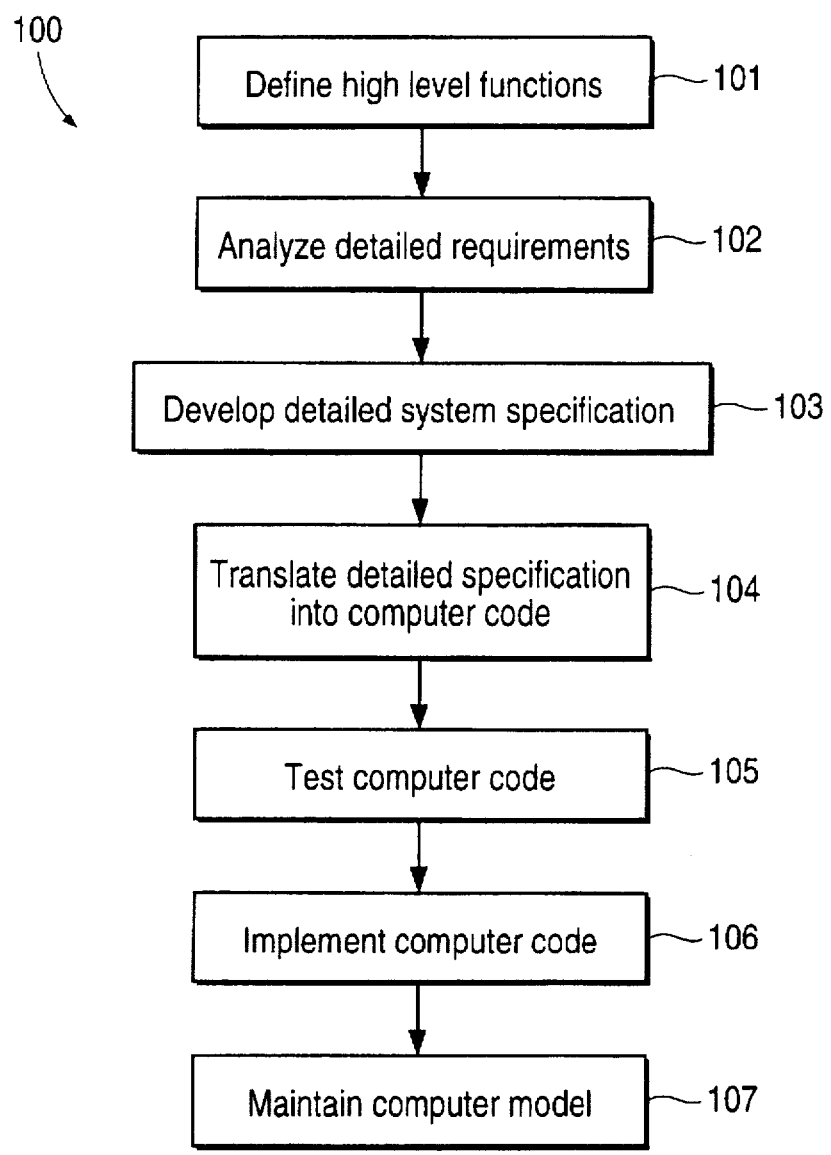
FIG. 1 s a flow chart illustrating a traditional method for developing a computer model to aid in managing an organizational enterprise.

FIG. 1 is a flow chart illustrating a traditional method 100 for developing a computer model to aid in managing an organizational enterprise. First, as shown by step 101, the high-level functions of the organizational enterprise are defined. In the context of scheduling a complex activity, such high level functions could include, for example, due dates for production of various finished goods. Next, as shown by step 102, these high-level functions are analyzed in light of the particular requirements of the organizational enterprise. Such requirements may be, for example, limitations on materials or labor availability. A detailed specification (written in English) that satisfies the requirements is then developed for the organizational enterprise, as shown by step 103. Such a specification may provide, for example, for procedures for obtaining materials or constraints for hiring more labor. As shown by step 104, the detailed specification must be translated into a language that a computer can understand, i.e., into a computer code such as C or Pascal. Once this is done, proper operation of the computer code is tested, as shown by step 105. When acceptable operation is verified, the computer model of the system can be implemented (e.g., compiled and installed), as shown by step 106. As shown in step 107, it is necessary to constantly maintain the computer model, maintenance entails performing one or more of the steps 101 through 106 until the computer model is updated to adequately reflect the changed circumstances. This traditional method of developing a computer model for use in managing an organizational enterprise suffers from several deficiencies, discussed in greater detail above.

FIG. 2 is a block diagram illustrating operation of a system and method according to the invention. The system and method according to the invention enable a developer to easily model the operation of a system or process (hereafter, "system" and "process" are referred to collectively as "enterprise") such as an organizational enterprise using a modeling language according to the invention to create a high-level description 201 of the enterprise. In contrast to the computer code used to implement the detailed specification (step 104 in FIG. 1) in the traditional method 100, the modeling language according to the invention is constructed so that modeling of the enterprise is readily accessible to developers with relatively little training in use of the modeling language. Further, the modeling language enables the enterprise to be modeled using a relatively small body of descriptive information, as compared to the large amounts of computer code required to implement the same model using the traditional method 100. The high-level description 201 is automatically translated by a translator 202 into a lower-level description 203 of the enterprise. The lower-level description 203 can more readily be used by a processing device to dynamically exercise the model, e.g., to process input information regarding operation of the enterprise to yield output information that enables analysis and control of the operation of the enterprise.

The system and method according to the invention are particularly useful in managing a complex enterprise, the operation of which is characterized by a large body of information. For example, the system and method according to the invention can be used to create and maintain a scheduling system for scheduling an activity such as a manufacturing operation. "Scheduling" is the process of assigning times and resources to the tasks of an operation. Scheduling assignments must satisfy a set of constraints which can include, for example, temporal constraints, milestone constraints, resource constraints, state constraints and preemptive constraints. The system and method according to the invention can be used, for example, to develop a scheduling model that implements a scheduling technique known as constraint-based iterative repair. In constraint-based iterative repair, a complete schedule that does not adequately satisfy the constraints is iteratively modified to obtain a series of complete schedules until one of the modified schedules adequately satisfies the constraints.

Figure 3:
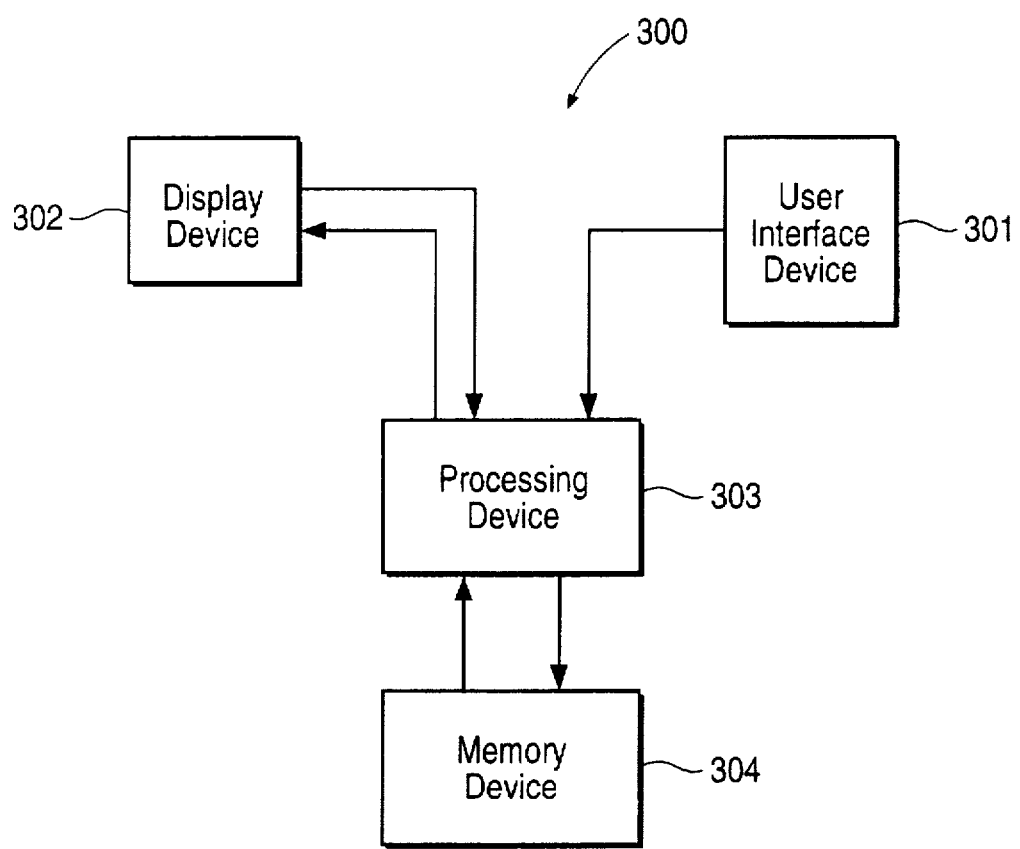
FIG. 3 is a simplified block diagram of a system according to one embodiment of invention.

For a complex enterprise, the system and method according to the invention can be advantageously implemented using an electronic processing device such as a computer. FIG. 3 is a simplified block diagram of a system 300 according to one embodiment of the invention. The system 300 includes a user interface device 301 (e.g., a keyboard or a mouse), a display device 302 (e.g., a computer display screen or a printer), a processing device 303 (e.g., a conventional microprocessor), and a memory device 304 (e.g., a magnetic disk and a random access memory). Each of the devices 301 through 304 are conventional and are widely commercially available.

The user interface device 301 enables control of aspects of the operation of the system 300, as will be apparent from the discussion below. For example, the user interface device 301 can be used to establish or modify a model of an enterprise by specifying information describing the enterprise. For example, if the system 300 implements constraint-based iterative repair, the interface device 301 can be used to add constraints to the system 300 or modify aspects of existing constraints. The interface device 301 can also be used to review in various ways the information output by the system 300. For instance, if the system 300 is used for scheduling, any portion of a complete temporal schedule can be displayed or the nature of constraint violations in a completed schedule (if applicable) can be displayed for review.

The display device 302 displays information regarding the operation of the system 300. For instance, the display device 302 can display the modeling information entered by a developer that describes the enterprise. The display device 302 also displays output information regarding operation of the enterprise. For example, if the system 300 is used for scheduling, portions of the schedule can be displayed in a variety of formats such as histograms of resource availability, Gantt charts of task schedules, or tables of various scheduling information.

The processing device 303 controls the flow of information between the user interface device 301, the display device 302 and the memory device 304. The processing device 303 also manipulates the information in various ways. For instance, the processing device 303 can use information describing the model of the enterprise and information specifying one or more input conditions to generate output information regarding the operation of the enterprise for that set of input conditions. The processing device 303 can also be used to translate the high-level description 201 (FIG. 2) of an enterprise to the lower-level description 203, i.e., the processing device 303 can be used as the translator 202 (however, this need not necessarily be the case).

The memory device 304 stores information used by the processing device 303 as input and information provided by the processing device 303 as output. For example, the memory device 304 stores the information describing the high level description of the enterprise that is entered by the developer into the system 300 using the user interface device 301. The memory device 304 also stores instructions for translating the high level description 201 (FIG. 2) into a lower level description of the enterprise that can be used by the processing device 303. Additionally, the memory device 304 stores information regarding the operation of the enterprise for specified sets of operating conditions.

The memory device 304 includes both a permanent memory (e.g., a hard drive) and a random access memory (RAM). Preferably, the memory device 304 includes a relatively large RAM, e.g., between approximately 32 megabytes and approximately 2 gigabytes. The exact memory capacity needed is a function of the complexity of the enterprise. The system 300 can operate with a smaller RAM, but will have decreased operating speed.

The system 300 can be implemented on, for instance, a computer. According to one embodiment of the invention, the system 300 is implemented on a Sun Sparc workstation using the Sun Solaris operating system, both of which are sold by Sun Microsystems of Mountain View, Calif. In another embodiment, the system 300 is implemented on an HP 9000 series workstation using the HP UX operating system, both of which are sold by Hewlett Packard of Palo Alto, Calif. In still another embodiment, the system 300 is implemented on any Unix workstation using a Unix operating system, as commercially available from a number of vendors. In still another embodiment, the system 300 is implemented on any computer that uses the Windows NT or Windows (version 3.1 or higher) operating system. Generally, the system 300 is not limited to implementation on any particular computer or using any particular operating system.

As discussed above, a model of an enterprise can be developed using a high-level modeling language according to the invention. In one embodiment of the invention, the modeling language is a high-level object-oriented language (hereinafter referred to as "AML" for "application modeling language") having particular characteristics that provide unique advantages. AML is used to develop an object-oriented program that models the enterprise and the enterprise's behavior. As will become apparent from the description below, AML makes it easy for a model developer to develop a model that incorporates the unique features of a particular enterprise. Further, AML shields the model developer from many of the mundane tasks associated with maintaining data integrity in complex data structures. In particular, as explained in more detail below, AML provides special utilities and data structures for storing and manipulating time-varying data, and for tracking and maintaining the run-time state of the data describing the configuration of the enterprise, without requiring considerable effort on the part of the model developer.

The syntax of AML is similar to the syntax of the C programming language. For instance, most statements are ended with a semicolon (";"). This similarity will become apparent from the numerous examples given below to illustrate particular aspects of the invention as they are manifested in the embodiment of the invention that makes use of AML.

Additionally, C++ functions can be accessed from any AML program. This allows existing C++ utilities to be linked to AML and used "as is".

FIG. 4 is a block diagram illustrating operation of a system and method according to this embodiment of the invention. The high-level description 411 of an enterprise is created using AML. A high-level translator 412 translates the high-level AML description into an intermediate-level description 413. In one embodiment, the intermediate-level description 413 is written in C++. The intermediate-level description can be expressed in other computer languages such as Smalltalk. A low-level translator 414 translates the intermediate-level description 413 into a machine-executable description 415 that can be used by a computer.

The structure and use of object-oriented languages is well-known by those skilled in the art and has been described in a large number of publications. A good description of object-oriented languages can be found in, for example, the book entitled *Object-Oriented Technology: A Manager's Guide*, by David A. Taylor, Ph.D., Addison-Wesley Publishing Company, 1990. A brief discussion of the structure and operation of an object-oriented language is given herein to provide a framework for the illustrative description of the invention below.

The basic building block of an object-oriented program is the "object." An object includes a set of related data elements that define data variables, that point to other objects, i.e., "instances" (explained in more detail below) or "classes" (also explained in more detail below), or that point to "actions" (actions are also sometimes referred to as "procedures" or "methods"). Each data variable is used to store a data value that represents a characteristic of the object. Each action defines a sequence of operations that represents a characteristic behavior of the object. Each data element has a data type that dentifies the characteristics of the data.

Actions typically operate on the data variables of the object in which the actions appear. The same action can appear in more than one object; the action may or may not be tailored to fit the characteristics of particular objects. Actions can be used to, for example, perform calculations, change the value of a data variable, or report the value of a data variable.

A "message" is used to enable objects to communicate with each other. A message specifies the name of an object along with one of the object's actions, indicating that the designated action of the designated object should be carried out. The result of carrying out that action is then used by the program in some manner. Since the same action can be included in any number of objects, the same message can be sent to any number of different objects. This is an important feature of the object-oriented approach because it allows new objects to be added to a program without changing existing objects.

Often, one or more objects will share some of the same characteristics, i.e., data elements. To further simplify the creation of individual objects, these characteristics can be grouped together in a "class." The individual objects which possess these characteristics are then said to be "instances"

of that class. Each instance has a particular data value for each data variable. Classes can further be defined as specialized cases ("subclasses") of more general classes. Thus, typically, in an object-oriented program, a hierarchy of classes is formed. At the bottom of the hierarchy are the instances of the classes, which constitute the individual objects of the program. Each object inherits and reflects the behavior and characteristics of each of its parent classes (i.e., classes associated with the object by a path upward through the class hierarchy), an attribute called "inheritance." Inheritance from more than one parent class is called "multiple inheritance" (note that "multiple inheritance" refers only to inheritance from multiple parent classes named in a single class definition and not to inheritance from multiple parent classes through a chain of superclasses.

An AML program includes a series of actions and classes, interspersed together. AML programs are activated by event loops. A processing device continually queries for an event that starts a procedure which ultimately results in the execution of an AML action (AML actions are explained in greater detail below). The event could be, for example, detection of an input from a graphical user interface (GUI) such as a mouse click on a particular icon displayed on a computer display screen. The event could also be a remote procedure call from an external system such as a shop floor control system, an MRP (material requirements planning) system or any relational database system; in short, any external system that can send transactions into the AML program. Execution of an AML action causes successive executions of other AML actions until the AML program terminates.

As explained above, classes provide a template for the data elements of a group of related objects. A class is similar to a C structure or a Pascal record. AML provides a run-time object system (i.e., classes of objects can be created and used after the system is running) such as used in LISP, thus making customization easier and object definition more flexible. A generic structure of a class according to one embodiment of the invention is given immediately below in Example 1 (italicized names indicate information that must be specified by the developer).

EXAMPLE 1

```
class new_class_name : parent class_name_1 . . .
                       parent class_name_N {
    data_type slot_name_1
    .
    .
    .
    data_type slot_name_N
};
slot new_class_name.slot_name_X { default: value };
```

Generally, a class includes a "class definition" followed by one or more "slot descriptors." The class definition is the first statement in a class and specifies information regarding the types of data elements ("slots") in the class. The slot descriptors are all of the subsequent statements in the class, and specify default values for one or more of the data elements and, in some cases, a class slot definition (explained below).

The first line (each line is delineated by an end-of-line character not shown in the Example 1 above or in the Examples described below) of the class definition specifies the name of the class (new_class_name) as well as any parent classes (parent_class_name_. . . parent_class_ name_N). The class name and parent class names are separated by a ":". Each class in the list of parent classes is separated by a space. As discussed above, the class inherits the characteristics of each named parent class. In AML, the order in which multiple parent classes are listed is important: parent classes listed first take first priority when data values and default data values are inherited to the class.

According to an embodiment of the invention, class names are a contiguous set of alphanumeric characters. In a further embodiment, underscores are used to separate characters of the class name into "words". In an alternative embodiment, capitalized characters are used to differentiate each "word" of a class name.

Successive lines of the class definition after the first line are used to define data elements. Each successive line is a slot and the data definition on that line is a "slot definition". Braces ("{}") are used in the class definition to identify the beginning and end of any slot definitions.

Each slot definition includes the type of data (data_type) in the slot and the name of the slot (e.g., slot_name_1). Data types are discussed in more detail below. The slot name enables the data element of the slot to be accessed by other parts of a program. As seen, for example, in the slot descriptors described below, a slot of a class is accessed using a dot notation, i.e., a slot value is accessed by specifying class_name.slot_name. The dot notation is also used to enable access of "oset" functions (described in more detail below.).

A class can be established with no slot definitions. This is sometimes necessary for reasons discussed more fully below.

After the class definition, appear the slot descriptors. Each slot descriptor specifies a slot name (new_class_ name.slot_name_X) of a data element and a default value (value) for the data element. The slot descriptor may also include a class slot definition (described below). A class need not necessarily include any slot descriptors. A class cannot include more slot descriptors than there are data elements in the class definition. If a default value is not given for a data element of a class, a value is provided at the time that each instance of the class is created. (Creation of instances is discussed in more detail below.) Further, note that a default value of a class can be overridden by the specification of a different default value for the data element in a subclass.

AML makes use of data types having pre-defined characteristics. In one embodiment, AML enables use of the following data types (each of which is described in more detail below): "int," "float," "time," "date," "string," "instance," "class," "enum," "oset," "history," and "action." Each data type can be referenced in a slot definition (described above) or an action parameter definition (described in more detail below).

The data type "int" is used for storing integer data values and is analogous to the data type "long" in C.

The data type "float" is used for storing float data values and is analogous to the data type "double" in C.

The data type "time" is used to store a duration of time in seconds. The data type "time" is usually used to represent a duration of time that is to be added to or subtracted from data of data type "date" (see immediately below).

The data type "date" is used to store an exact calendar date (e.g., 1/1/94). Two values of type "date" cannot be added together, e.g., adding 1/1/94 8:00:00 to 2/1/95 16:00:00 is meaningless and therefore illegal in AML. However, a "time" value may be added to a "date" value, e.g., a "time" value of 2 days can be added to the "date" value 1/1/94.

The data type "string" is used to store a sequence of textual (typically alphanumeric) characters. The value of data of data type "string" must be enclosed within double quotes.

The data type "instance" is used as a pointer to an object instance. As described above, an instance is an object that is a particular case of an object class. An "instance" data type gives quick access to the slots of an object instance and is generally used to link object instances to their parent classes.

The data type "class" is used as a pointer to an object class. This data type allows linking from one class to another related class having a more specific set of characteristics. For instance, in a scheduling model, the class of technicians may have a class slot for technicians of a particular skill level or skill in performing a particular task. Or, the class of machinery may have a class slot for a particular class of machinery to perform a particular task.

The data type "enum" is used to store one of a pre-defined set of related values. Data of data type "enum" can only be compared to other data of data type "enum" (unlike the data type "enum" in C which can be compared with integer data).

The data type "oset" is used to store an ordered set of data of a particular AML data type. Data of data type oset is stored as a list. All AML data types other than the oset data type can be referenced as the data type in an oset. However, the prohibition on specifying an oset of osets can be circumvented by specifying an oset of instances, where each instance points to an oset. Some examples of the specification of an oset data type are: oset[instance<Base_Class>], oset[int], oset[string], and oset[float].

AML provides several functions for manipulating data stored in lists, i.e., oset data. An item can be added to the beginning or end of a list. An item can be deleted from any point on a list. The value of any item on a list can be accessed. The contents of the entire list can be deleted at one time. Each of these functions is called by specifying an oset function. As indicated above, the dot notation is used with oset functions. An oset function is called by specifying osetfunction().

The data type "history" is a special data type that is used to store time-varying data. Several types of "history" data type may be created, e.g., history<int>, history<float>, and history<string>. The values of history data cannot be changed directly by AML statements. Rather, a side effect mechanism (described in more detail below), similar to a database trigger or a "demon", changes the value of history data.

The data type "action" is used as a pointer to an AML action. An action is a group of executable AML statements which accept input data and produce output data. Actions are described generally above and, as implemented in AML, in more detail below. An action can be referenced and executed (dispatching the action) from any point in an AML program. Changing in a subclass the value (i.e., action) stored in an action data element (i.e., stored in an action slot) provides a way to associate particularized behavior with particular classes of objects.

Example 2 below illustrates a class definition including all of the above-mentioned data types. (Note that "//" denotes a comment that is not processed during execution of a program written in AML. The end-of-line character specifies the end of each comment.)

EXAMPLE 2

```
class Football_Game : Base_Class { // Define a class called
                                   // "Football_Game"
  int                number_of_referees
  float              percent_bad_calls
  time               duration_of_the_game
  date               birthday_of_the_quarterback
  string             name_of_the_stadium
  instance<Player>   quarterback
  class<Football_Game>  type_of_next_weeks_game
  enum<Football_Rules>  rules
  oset[instance<Player>] all_players
  history<int>          score_thru_time
  action<display_scores>  display_scores_action
};
slot Football_Game.number_of_referees { default: 5 };
slot Football_Game.percent_bad_calls { default: 0.01 };
slot Football_Game.duration_of_the_game
   { default: 10800 }; // 3 hours
slot Football_Game.birthday_of_the_quarterback
   { default: 03/16/67 19:00:00 };
slot Football_Game.name_of_the_stadium
   { default: "Soldier Field" };
slot Football_Game.quarterback { default: Joe_Montana };
slot Football_Game.rules { default: PRO };
slot Football_Game.display_scores_action
   { default: display_scores_verbosely };
```

Example 2 illustrates a class named "Football_Game" which, obviously, represents football games generally. The class "Football_Game" inherits the characteristics of a parent class "Base_Class". (The class "Base_Class" is a special AML class that is discussed in more detail below.) The slots in the class definition each list a characteristic of a football game, such as the duration of a game, e.g., slot "duration_of_the_game". The slot descriptors following the class definition each specify a plausible value as a default value for one of the slots, e.g., Football_Game.duration_of_the_game {default: 10800} (the default value for the duration of the game is 3 hours; recall that a "time" data type stores a value in seconds).

In one embodiment of the invention, "Base_Class" is the root class of AML, acting as the foundational building block upon which all other AML classes are formed. All classes in AML other than Base_Class must have a parent class; Base_Class has no parent class. Base_Class provides some "hidden" utilities and functionality that are necessary for an AML program to operate (e.g., communication to and from the graphical user interface, unique identifier for each object).

As discussed above, classes are sometimes established with no slot definitions. This is called "class declaration". Declaring a class is necessary when one class includes a reference to another class before that class has been defined. The class declaration suffices as a class definition until the complete definition is established later. Example 3 illustrates the type of situation when a class declaration is necessary.

EXAMPLE 3

```
class Red_Pepper;                          // The class declaration
class Pepper_Basket : Spl_Class {
   oset[instance<Red Pepper>] red_peppers // A reference to
                                           // to "Red_Pepper"
};
class Red_Pepper : Spl_Class Named_Object { // The full
                                            // class definition
   instance<Pepper_Basket> my_basket        // A reference to
```

```
                                    // "Pepper_Basket"
    int        temperature_scale
};
slot Red_Pepper.temperature_scale { default: 10 };
```

In Example 3, there is a class declaration of the class "Red_Pepper", followed by a class definition of the class "Pepper_Basket" and then a class definition of the "Red_Pepper". It is necessary to declare the class "Red_Pepper" because the class "Pepper_Basket" refers to "Red_Pepper" before the class "Red_Pepper" is defined. Note that no class declaration of the class "Pepper_Basket" is necessary, despite the fact that the class "Red_Pepper" refers to "Pepper_Basket", because the class "Pepper_Basket" is defined before the reference to "Pepper_Basket" in the class "Red_Pepper".

By default, the values for each slot are stored on the instances (called "instance slots") of a class. If the keyword "class_slot:" is provided at the end of the default value clause in a slot descriptor, the slot's value will be stored and maintained on the object class (called class slots). Thus, all instances of that class will have the same value for that slot. Use of the "class_slot" keyword is an efficient way to specify values for a set of slots having the same value. All of the previous class definition examples have defined instance slots. Example 4 illustrates definition of class slots.

EXAMPLE 4

```
class Spl_Class : Base_Class {
    int value_1
    float value_2
    string description
};
slot Spl_Class.value_1 { default: 10 class_slot: };
slot Spl_Class.value_2 { default: 99.345 class_slot: };
slot Spl_Class.description { default "default description"
    class_slot: };
```

As discussed above, actions define a sequence of operations that represents a behavior. An action is a group of executable AML statements which accepts input data and produces output data. Actions are similar to C functions and Pascal procedures, but provide much more than the procedural abstraction of functions and procedures. All executable AML code must be written in actions. No executable AML code can be written outside of an action body. A generic structure of an action according to one embodiment of the invention is given immediately below in Example 5 (italicized names indicate information that must be specified by the developer).

EXAMPLE 5

```
action<schema_name> action_name
OR
action action_name
    (parameter_type: data_type parameter_name_1
    .
    .
    .
    parameter_type: data_type parameter_name_N,
    no_context:
    )
{           // the beginning of the action body
```

```
    succeed();
    OR
    fail();
};          // the ending of the action body
```

Generally, an action includes an "action definition" followed by an "action body." The action definition is the first statement in an action and specifies the inputs to and outputs from the action body. The action body includes all of the statements in the action, each of which is a predefined AML statement that performs a specified operation.

The first line of the action definition specifies the name of the action (action_name) and the action schema (schema_name), if any. The schema name is specified inside of braces ("<>"). If an action without a schema is being defined, the braces are not used. Action schemas are discussed in more detail below.

According to an embodiment of the invention, action names are a contiguous set of alphanumeric characters. In a further embodiment, underscores are used to separate characters of the action name into "words".

Successive lines of the action definition after the first line are used to define an action parameter list. Each line represents an "action parameter" and the definition on that line is a "parameter definition". Action parameters are discussed in more detail below. Parentheses ("()") are used in the action definition to identify the beginning and end of the action parameter list.

Each parameter definition includes the parameter type (parameter_type), data type (data_type), and parameter name (parameter_name_1). A parameter type always ends with a colon (":") and is separated from the data type by at least one space. The data type and parameter name are also separated by at least one space. A default parameter value can be specified by following the parameter name with and equal sign ("=") and the default parameter (see Example 8 below). The parameter name is followed by a comma to end the entire parameter definition, except for the last parameter definition. The last parameter definition is ended with the enclosing parameter list parenthesis.

An action can be established with no parameter definitions. This is sometimes necessary for reasons discussed more fully below.

After the action definition appears the action body. The beginning of the action body is specified with a left brace ("{"). All AML statements that constitute the operations of the action must start after this brace. An action is entered at the first statement after the brace. AML statements that can be used within an action body include, for example, "execute" statements, assignment statements, "if-then-else" structure, while loops and for each loops, and are discussed in more detail below. (Note that while none of these statements are shown in the generic structure of Example 5, typically, one or more of these statements will be present.) Inside the action body, the statement "succeed();" or "fail();" must exist. "Succeed" and "fail" are exit statements for the action. In addition to causing exit from the action at the place where they are called, "succeed" and "fail" also specify if the changes made to object values inside the action are accepted or rejected. (In one embodiment, a compiler for compiling a program written in AML can detect a missing succeed statement and add it where appropriate.) The end of the action body is specified with a right brace ("}") and must be followed by a semicolon.

In one embodiment, AML enables use of the following action parameter types (each of which is described in more detail below): input, local and output.

Input action parameters are similar to C function arguments and accept data values of any AML data type. Default values may be specified for input parameters in a manner similar to that in which C defaults are specified. Example 8 below shows an input parameter with a default value.

Output action parameters are similar to function return values in C. However, in AML, unlike C, an unlimited number of output parameters may be defined in an action. When an action is finished executing, the output parameters of the action may be accessed for data values. It is wise to provide a default value for output parameters in the action body to prevent errors that result by using output parameters that have not been given a value. If default values are provided for output action parameters, succeed or fail statements may safely be placed anywhere in an action body. Example 8 illustrates an output parameter being initialized at the beginning of the action body (rather than having a default value specified).

Local action parameters are AML's version of local variables used in the C programming language. The effect of local parameters is limited to the actions in which the local parameters are defined. Example 8 shows a local parameter with a default value.

The keyword "no_context:" may also be included inside the action parameter list (it is optional). The presence or absence of the "no_context:" keyword governs whether a new "context" is created upon commencement of action execution. If the "no_context:" keyword is not present, an action will create a new context before executing. In general, actions that do not make any changes in the configuration data should be given the "no_context:" keyword. Any action that does change configuration data may need a context, and is therefore a good candidate for omitting the "no_context:" keyword. The decision as to whether an action that makes changes needs a context is made based upon performance considerations; i.e., to what degree the absence of the context affects the fidelity of the enterprise modeling versus the increase in speed and reduction in memory requirements attendant elimination of the context. Contexts are discussed in greater detail below.

Examples 6, 7 and 8 illustrate several different actions. Example 6 is a simple action that prints "Hello There". Example 7 is a more general action that prints "Hello There" by passing in that string to the action. Example 8 is a relatively complex action that illustrates the use of various types of action parameters and AML statements, as well as default parameter values.

EXAMPLE 6

```
action print_hello_there
    ()                   // no action parameters
{
    PRINTF("\nHello There\n"); // call the C printf
    succeed();
};
```

EXAMPLE 7

```
action print_simple_string
    (input: string pstring,   // pass in the string
                              // to be printed
     no_context:)             // special flag to prevent
                              // context creation
{
    PRINTF("\n%s\n", pstring); // call the C printf
    succeed();
};
```

EXAMPLE 8

```
action print_simple_string
    (input: string pstring = "Null",  // pass in the string
                                      // to be printed
     local: int string_length = 0,    // local variable with
                                      // a default value
     output: int printed,             // show that the
                                      // string was printed
     no_context:)                     // prevents the creation
                                      // of a context
{
    printed = 0;                      // initialize the
                                      // output: parameter
    string_length = STRLEN(pstring);  // call the C strlen
    if (LT (string_length, 2)) {      // IF string length is
                                      // less than 2
        PRINTF("\nstring < 2");       // THEN print a
                                      // warning ...
        fail();                       // ... and fail from
                                      // the action
    }
    else {
        PRINTF("\n%s", pstring);      // ELSE call the C
                                      // printf ...
        printed = 1;                  // ... set the output
                                      // variable
        succeed();                    // ... and succeed from
                                      // the action
    };
};
```

Actions can call other actions using the "execute" statement. The structure of the "execute" statement is: execute action_name (parameter_name_1 value, . . . parameter_name_N value). Input parameter values are specified after the action_name and are listed by parameter name. Since all input parameters in AML are identified by parameter name, rather than by argument position, not all input parameters must be listed in each execute statement, nor must the input parameters be listed in a fixed order. If not all input parameters are listed, each unlisted input parameter assumes the default value of the input parameter designated in an action schema (described below). Example 9 illustrates an action ("action add_some_ints") using the execute statement within the action body to call a previously defined action ("action add_three_ints") having multiple input parameters.

EXAMPLE 9

```
action add_three_ints
    (input: int arg1 = 0,    // Three input parameters ...
     input: int arg2 = 0,    // ...
     input: int arg3 = 0,    // ...
     output: int result,     // One output parameter
     no_context:)
{
    result = ADD(ADD(arg1, arg2), arg3); // nested calls
                                         // to the function ADD
    succeed();
};
action add_some_ints
```

```
        (local: action<add_three_ints> add_three_ints,
        no_context:)
{
        execute add_three_ints(:arg1 1,
                              :arg2 1,
                              :arg3 2);
        PRINTF("\nResult is:: %d\n", add_three_ints.result);
        execute add_three_ints(:arg2 3, // Notice that the args
                              :arg3 16, // do not have to be in
                              :arg1 67); // positional order
        PRINTF("\nResult is:: %d\n", add_three_ints.result);
        succeed();
};
```

An action can assign a value to a data element using an assignment statement. The structure of an assignment statement is location=expression. A "location" can be an action parameter or a slot reference. An "expression" can be, for instance, a value or a function call that returns a value.

An action can also include an "if-then-else" statement structure. This structure includes two statements: an "if" statement and an "else" statement. The structure of the "if-then-else" statement structure is given in Example 10.

EXAMPLE 10

```
        if (expression) {
                AML statement(s)
        };
        else {
                AML statement(s)
        };
```

An action can also include a while loop. Example 11 gives the generic structure of a while loop.

EXAMPLE 11

```
        while (expression) {
                AML statement(s)
        };
```

An action can also include a for each loop. Example 12 gives the generic structure of a for each loop.

EXAMPLE 12

```
        for each variable in oset {
                AML statement(s)
        };
```

Like classes, actions are sometimes referenced by other actions before having been defined. "Action declarations" provide a mechanism for referencing an action parameter list before the action has been defined. Action declarations are similar to the function prototype mechanism in C. Example 13 illustrates the use of an action declaration. Example 13 also shows the action definition that could be used at some point after the action declaration. Notice that the parameter list of print_simple_string is no longer referenced in the action definition.

EXAMPLE 13

```
        action print_simple_string
          (input: string pstring = "Null",
          local: int string_length = 0,
          output: int printed,
          no_context:);                  // A semicolon closes
                                          // the declaration
        action print_simple_string       // Parameter list was
                                          // already defined
        {
                printed = 0;
                string_length = STRLEN(pstring);
                if (LT (string_length, 2)) {
                        PRINTF("\nstring < 2");
                        fail();
                }
                else {
                        PRINTF("\n%s", pstring);
                        printed = 1;
                        succeed();
                };
        };
```

As discussed above with respect to Example 5, the first line of an action definition can include an action schema in addition to an action name. An action schema declares a common structure (or template) for action parameters. Duplicate action parameters of similar actions can be grouped into an action schema, thus reducing redundant definition of the action parameters. Action schemas perform a function similar to that of classes in the definition of objects. A generic structure of an action schema according to one embodiment of the invention is given immediately below in Example 14 (italicized names indicate information that must be specified by the developer).

EXAMPLE 14

```
        action schema schema_name
          (parameter_type: data_type parameter_name_1,
          .
          .
          .
          parameter_type: data_type parameter name_N,
          no_context:
          );
```

An action of a schema type will include all of the action parameters from the specified action schema. The action may also define additional parameters that not part of the action schema. These additional parameters are usually local parameters associated only with the particular action. Example 15 immediately below illustrates the use of an action schema with the action "print_simple_string" from Example 8.

EXAMPLE 15

```
action_schema print_str
  (input: string pstring = "Null", // define the
  output: int printed,    // action schema
  no_context:);           // "print_str"
action<print_str> print_simple_string // define
                           // print_simple_string   (local: int string_length
  = 0)    // of schema print_str
{
        printed = 0;
        string_length = STRLEN(pstring);
```

-continued

```
if (LT (string_length, 2)) {
    PRINTF("\nstring < 2");
    fail();
}
else {
    PRINTF("\n%s", pstring);
    printed = 1;
    succeed();
};
};
```

Action schemas also make it possible to store actions on objects (class definitions require an action schema type in the slot definition of an action). The action stored in an action slot of a class definition can be referenced and executed (dispatching the action). The dispatch must be performed by the AML programmer. This involves setting the value of a local action parameter in a calling action to the action slot of the class definition, and then calling the action via the local parameter. Example 16 immediately below illustrates storing actions on objects and dispatching those actions.

EXAMPLE 16

```
action_schema print_str
    (input: string pstring = "Null",
    output: int printed,
    no_context:);
action<print_str> print_string
    ()
{
    PRINTF("\n%s", pstring);
    printed = 1;
    succeed();
};
action<print_str> print_indented_string
    ()
{
    PRINTF("\n    %s", pstring);    // indent the string
    printed = 1;
    succeed();
};
class Printable_Object : Spl_Class {
    string      description
    action<print_str> print_action
};
slot Printable_Object.description { default: "default
                                    description" };
slot Printable_Object.print_action { default: print_string
                class_slot: };
action dispatch_print_string
    (input: instance<Printable_Object> printable_object,
    local: action<print_str> print_string_action,
    output: int printed,
    no_context:)
{   // Retrieve the print string action from the
    // object passed in
    print_string_action = printable_object.print_action;
    // Call the action
    execute print_string_action(:pstring
                printable_object.description);
    // Retrieve and set the output variable
    printed = print_string_action.printed
    succeed();
};
```

In Example 16, first an action schema "print_str" is defined, followed by he definition of two actions "print_string" and "print_indented_string" of schema "print_str". Then, a class "Printable_Object" is defined including an action slot that stores an action of schema "print_str". To reduce the amount of memory needed for each object instance, all action slots on classes are class slots using the keyword "class_slot:". Finally, an action "dispatch_print_string" is defined which executes the action "print_str" that is stored on an object of class "Printable_Object". When the action "dispatch_print_string" is passed an object of class "Printable_Object", the action "dispatch_print_string" will print the description of the "Printable_Object" by using the action stored on the "Printable_Object". This relatively simple example illustrates the power of the object-oriented modeling language according to the invention. The object-oriented modeling language according to the invention reduces the size and complexity of computer code, increases the readability of computer code, and allows modifications to computer code to made easily.

As mentioned above, C++ functions can be accessed from any AML program. To enable this, AML provides a mechanism for declaring C++ functions. Using this mechanism, the AML compiler simply substitutes the real C++ function for the AML declared function (which is named by the AML program developer). A structure for declaring a C++ function according to one embodiment of the invention is: cpp_function return_type AML_FUNCTION_NAME (argument_type1, . . . , argument_typeN) "cpp_function_name";. The reserved word "cpp_function" marks the beginning of the C++ function declaration. The "return_type" can be any AML data type or can be of type void (for C functions returning nothing). The AML_FUNCTION_NAME is the name that AML actions will use to reference the C++ function. The AML_FUNCTION_NAME is always capitalized so that it is easy to recognize as a C++ function declaration. The argument list must contain AML data types that are separated by commas. Finally, the actual C++ function name is referenced inside of double quotes and the declaration completed with a semi-colon.

The C function printf (used in previous examples) would be declared as follows: cpp_function void PRINTF (string) "printf";. The C function strcmp would be declared as follows: cpp_junction int STRING_COMPARE (string, string) "strcmp";.

In one embodiment, AML currently uses several C++ functions to implement basic programming operators such as equal-to, greater-than and less-than. Each of the operators takes 2 arguments and returns 1 value. Following is a list of the operators and the functional relationship of the arguments:

| Operator | Functional relationship of arguments |
| --- | --- |
| GT (greater than) | is argument1 greater than argument2 |
| LT (less than) | is argument1 less than argument2 |
| EQ (equal to) | is argument1 equal to argument2 |
| ADD (+) | add argument1 to argument2 |
| SUB (−) | subtract argument2 from argument1 |
| MUL (multiply) | multiply argument1 by argument2 |
| DIV (divide) | divide argument1 by argument2 |

Additionally, in one embodiment, AML provides the following basic C++ utility functions:

| Utility Function | Description |
| --- | --- |
| PRINTF | C printf function |
| DESCRIBE | print the values of an AML object |
| GET_DATE_STRING | returns a string representation of a date |
| STRING_COMPARE | C strcmp function |

-continued

| Utility Function | Description |
| --- | --- |
| MIN | minimum of two numbers |
| MAX | maximum of two numbers |
| EXP | C exp function |
| FLOAT_TO_INT | convert a float to an integer |
| INT_TO_FLOAT | convert an integer to a float |
| INT_TO_ASCII | convert an integer to a string |
| ABS | C abs function |
| MOD | modulus (%) operator |
| CREATE_OBJECT | create an AML object |
| DELETE_OBJECT | delete an AML object |
| GET_DESCENDANTS | retrieve descendant classes or instances |
| GET_DIRECT_DESCENDANTS | retrieve only direct descendant classes or instances |
| OBJECT_IS_ALIVE | returns 1 if an object is alive in the current context |
| GET_INSTANCE_BY_NAME | finds an object instance by name |
| GET_INSTANCE_BY_UID | finds an object instance by uid |
| GET_CLASS_BY_NAME | finds an object class by name |
| GET_CLASS_BY_UID | finds an object class by uid |
| GET_CLASS_OF_INSTANCE | return the class of an object instance |
| GET_NAME_OF_CLASS | return the name of a class |
| STRING_CONCAT | concatenates an oset of strings into one string |
| STRLEN | C strlen function |

During dynamic operation of a model developed according to the invention, the state of the model continually changes. The state at any point in time is represented by a set of configuration data. In one embodiment, the configuration data include any of the AML data types (discussed above), as well as pointers to "side effects" (discussed below).

As mentioned above, in some cases, a context is opened when an action begins. A "context" is a data structure that stores information regarding any changes in the configuration of the program (including data values) after the point at which the context was opened. In an AML program, the only changes that can occur are the creating and deletion of classes, the creation and deletion of instances, and the changing of the value of a data element. According to one embodiment of the invention, a context is a group of hash tables, each hash table storing one of the following: i) all classes created after the context was opened, ii) all classes deleted after the context was opened, iii) all instances created after the context was opened, iv) all instances deleted after the context was opened, v) all data elements whose values changed after the context opened, with the value of the data element at the time the context was opened, and vi) all side effects that have been fired.

Contexts enable the state of all of the program data values to be tracked and maintained easily, with little effort by the developer creating the program. The developer need only specify, for each action, whether a context should be opened or not at commencement of the action. Since a context stores information regarding data value changes, a context need only be opened by actions that cause data values to change.

A context enables two states of the program data values to be maintained simultaneously: an initial state at the beginning of the action (i.e., opening of the context) and a current state at any instant in time during execution of the action. The context allows a choice between retaining one of the two states. This choice can either be made automatically by the program or manually by a user. Typically, if the choice is made automatically by the program, the choice will be predicated on whether or not the program data values at the current state satisfy some set of pre-defined criteria. If the criteria are satisfied (a "succeed" statement), the current state is retained during further program activity; if not (a "fail" statement), the context is used to restore the initial state for further use.

Figure 5:
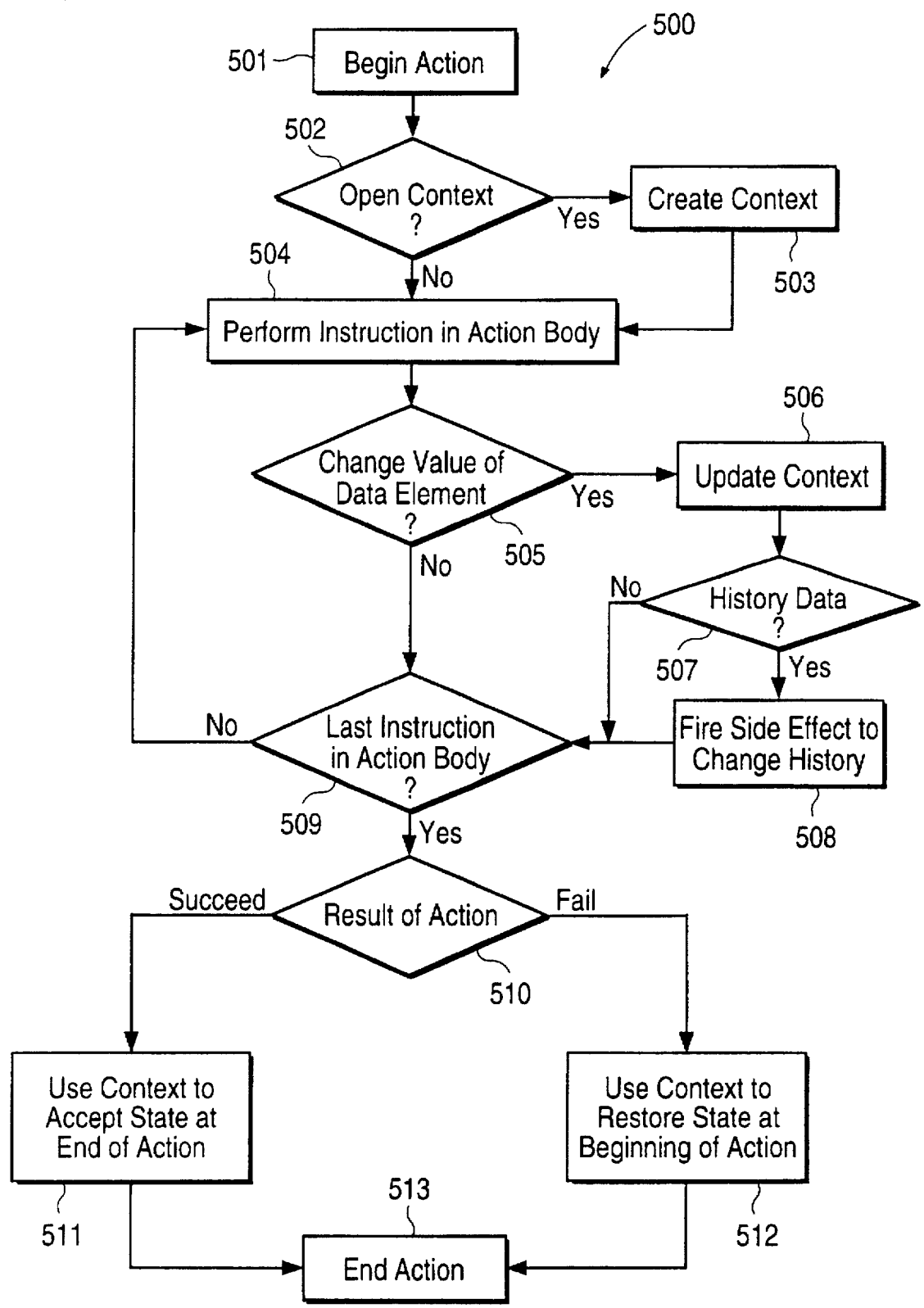
FIG. 5 a flow chart illustrating a method for tracking and maintaining program data values using contexts according to one embodiment of the invention.

FIG. 5 is a flow chart illustrating a method 500 according to one embodiment of the invention for tracking and maintaining configuration data using contexts.

In step 501, an action is begun, i.e., an action is called from some point in the program. In one embodiment of the invention, each context is associated with a unique execution of a particular action.

In step 502, the program decides whether to open a context for this action. As explained above, this decision is made based upon the presence or absence of the no_context keyword in the action parameter list of the context. If a context is to be opened, then, in step 503, a context is created, e.g., a C++ object is created that includes a set of empty hash tables.

Whether or not a context is created, the program begins to execute an instruction from the action body of the action, as shown by step 504. The instruction may or may not cause a data element to change in value. In step 505, this determination is made. If one or more data elements are changed in value by the instruction, then the context is updated with the change (if necessary), as shown by step 506. The context will not be updated for data elements whose value has been previously been changed since the context was opened. This is because the context stores, for each changed data element, a pointer to the data element and the value of the data element when the context was opened. If the value of the data element has previously been changed, there is no new information for the context to store and so the context is not updated with respect to that data element. Note that problems may occur if either a class or an instance are both created and deleted while a context is opened; remedial procedures may be required to resolve such problems. Objects that are added and deleted in the same context are placed on a "destroy" list. When the context succeeds, these objects are permanently deleted and their memory reclaimed.

The instruction in the action body may change the value of one or more data elements with which a data element of data type history is associated. This determination is made in step 507. For each such data element that is changed, a "side effect" is fired, as shown by step 508. A side effect is a special low-level (e.g., C++) object that links the slot (data element) that has changed with a history slot. When the slot value changes, the side effect "fires" and causes the history data structure to be updated to reflect the changed value. When a side effect fires, a pointer to the side effect is added to the context. This allows the changes made by firing the side effect to later be undone so that, if necessary (as explained below), the associated history slot can be returned to the state existing at the beginning of the action.

Figure 6:
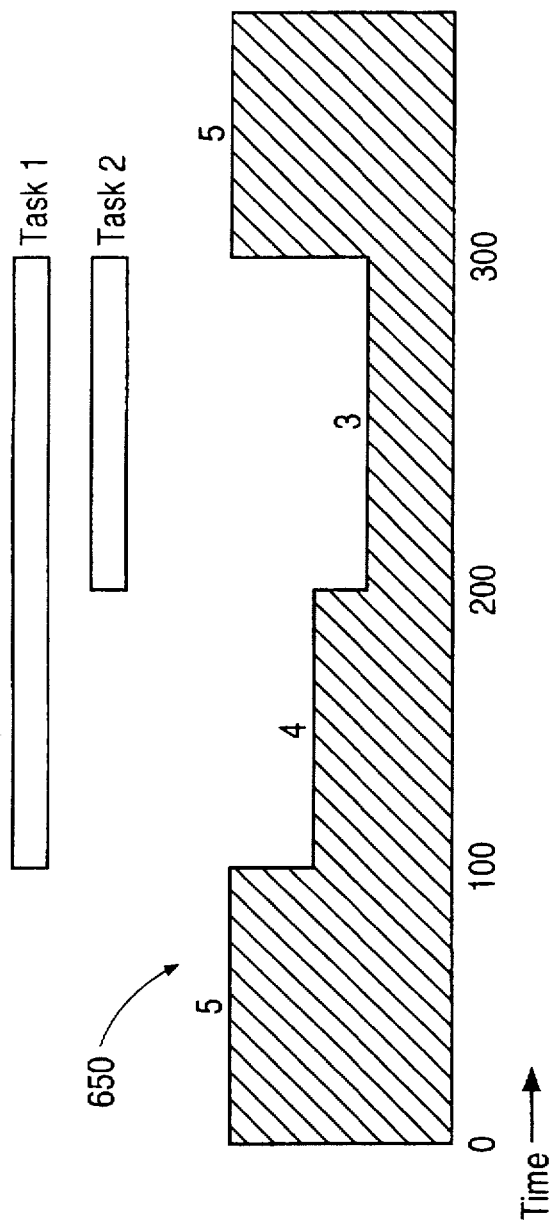
FIG. 6 is a schematic diagram illustrating the structure of a history data element.

FIG. 6 is a schematic diagram illustrating the structure of a history data element. A resource history 650 (shown as a histogram) is shown for a reusable resource pool. At time 0, the quantity of the resource available in the resource pool is 5. As illustrated by the bar above the resource history 650, Task 1 begins at time 100 and requires 1 unit of the resource. Since the data value of the history data element corresponding to the resource pool changes, a side effect fires. Thus, the resource history 650 decrements 1 unit from the pool. The resource pool has 4 units available from time 100 to time 200. At time 200, Task 2 begins. Task 2 also requires 1 unit of the resource. Again, the data value is changed and a side effect is fired. Since Task 1 continues to take place, a total of 2 units are decremented from the resource pool.

Consequently, the resource pool has only 3 units available from time 200 to time 300. At time 300, both Task 1 and Task 2 conclude, releasing the resources that were being used. As a result, the pool is incremented 2 units so that 5 units are again available in the resource pool. Another side effect is fired and the history is updated again to reflect this change.

A side effect includes a list of arguments, each argument being an object slot that can cause the side effect to fire, and the name of the history slot that is changed by the side effect. When the side effect fires, the designated history slot is changed using the information stored in the object slots that are the side effect arguments.

For example, in a scheduling model, a particular type of resource could be defined as an object class. The resource object class could include slots for the start time and end time for using the resource, a slot for the quantity of the resource being used, an instance slot designating the particular resource being used and a history slot for recording the availability of the resource over time. When one of the start time, end time, quantity or instance slots are changed, a side effect fires causing the history slot for that resource to be updated in a manner as described above with respect to FIG. 6.

In one embodiment, AML uses C++ functions to create side effects (i.e., associate a side effect with one or more slots of an object). Some of these functions are shown in Example 17 immediately below. The list of functions in Example 17 is not exhaustive, but merely illustrates the creation of side effects in AML.

EXAMPLE 17 acceptable set of configuration data (e.g., an acceptable schedule score and no violations of hard constraints), a "succeed" statement is issued. If the action produces an unacceptable set of configuration data (e.g., an unacceptable schedule score or a violation of a hard constraint), a "fail" statement is issued.

Figure 7:
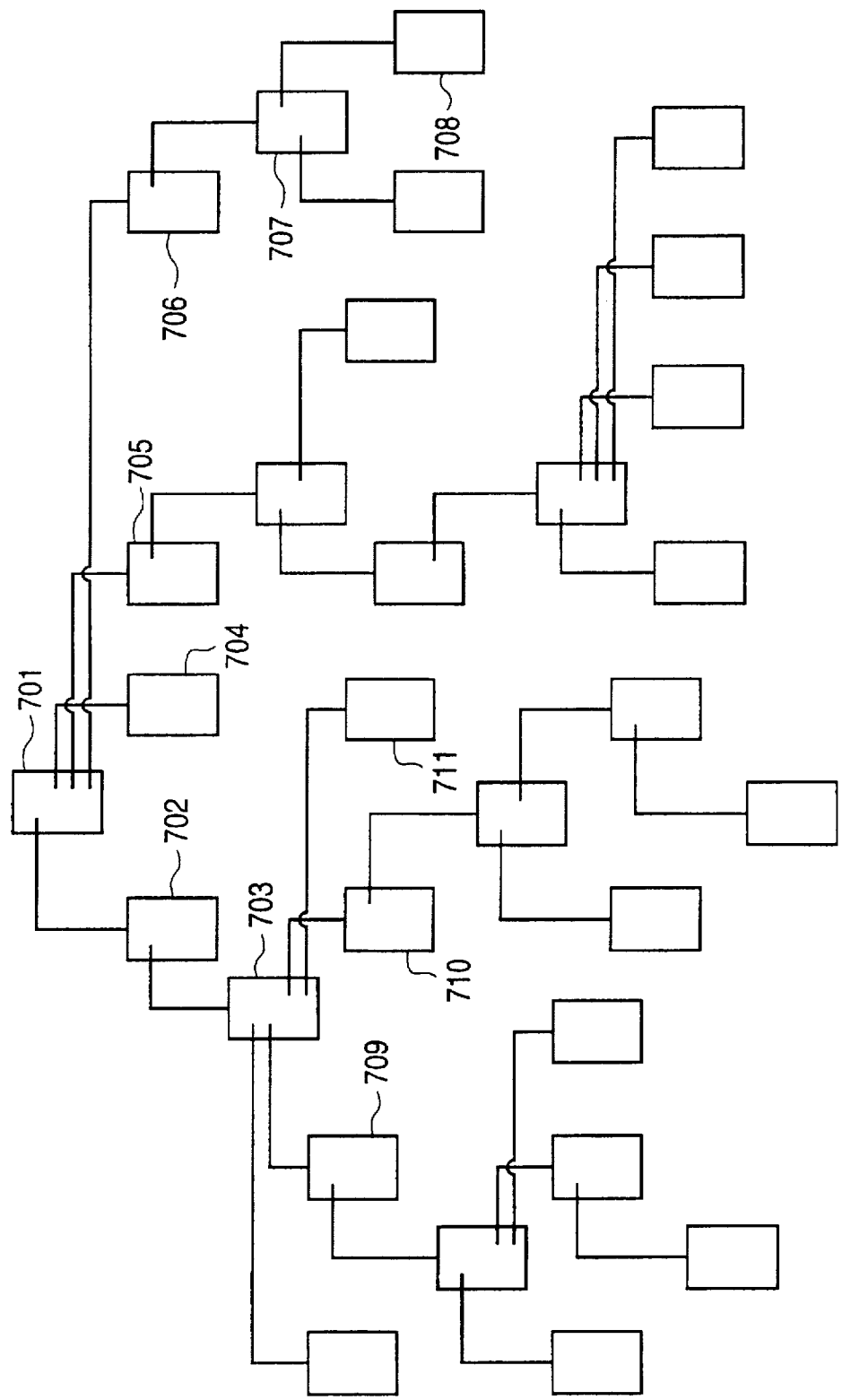
FIG. 7 a tree diagram illustrating the structure of an AML program during execution.

Multiple contexts can be opened at one time. This can occur because actions can execute other actions. Thus, a nested set of contexts can be opened. FIG. 7 is a tree diagram illustrating the structure of an AML program 700 during execution. Each box in FIG. 7 can be thought of as an action, each action including a sequence of statements to be executed. At the same time, each box can also be thought of as a context, each context including a list of data elements that have been changed by the action and side effects that have been fired during the action. For example, during execution of the action represented by box 701, a statement is executed that causes the action represented by box 702 to begin execution. During execution of the action of box 702, in turn, an action represented by the box 703 is called. As shown by the lines extending between various boxes in the hierarchical structure of FIG. 7, this nesting of actions can extend down many hierarchical levels and/or can include many actions at the same hierarchical level (see, e.g., boxes 702, 704, 705 and 706). Some actions (see, e.g., the action represented by box 704) do not call other actions and simply return control to the calling action (the action represented by box 701 in this case). Program control moves up and down the tree structure of FIG. 7, gradually moving left to right, until the nested set of actions represented by boxes 706, 707 and 708 are finally executed. After completion of these actions, control returns to the top level calling action (box 701) and the program 700 eventually terminates.

```
cpp_function void CREATE_RESOURCE_SIDE_EFFECT (instance<Spl_Class>)
    "cpp_create_resource_side_effect";
cpp_function void CREATE_RESOURCE_CONSUME_SIDE_EFFECT
(instance<Spl_Class>)
    "cpp_create_resource_consume_side_effect";
cpp_function void CREATE_RESOURCE_SUPPLY_SIDE_EFFECT
(instance<Spl_Class>)
    "cpp_create_resource_supply_side_effect";
cpp_function void CREATE_STATE_CONSTRAINT_SIDE_EFFECT
(instance<Spl_Class>)
    "cpp_create_state_constraint_side_effect";
cpp_function void CREATE_AFTER_END_STATE_EFFECT_SIDE_EFFECT
(instance<Spl_Class>)
    "cpp_create_after_end_state_effect_side_effect";
cpp_function void CREATE_AFTER_START_STATE_EFFECT_SIDE_EFFECT
(instance<Spl_Class>)
    "cpp_create_after_start_state_effect_side_effect";
cpp_function void CREATE_DURING_STATE_EFFECT_SIDE_EFFECT
(instance<Spl_Class>)
    "cpp_create_during_state_effect_side_effect";
```

Returning to FIG. 5, whether or not a data value changes and a context is updated, the next instruction, if any, is executed. The process of updating the context and histories is repeated.

Finally, when all instructions are completed, as determined by step 509, the result of the action is tested, i.e., the state of the configuration data is compared to a predetermined set of criteria. For example, if the model implements the technique of constraint-based iterative repair (discussed above), the configuration data can be tested to determine the degree to which the constraints have been violated (i.e., a schedule score is obtained). The configuration data can also be compared to "hard" constraints, the violation of which is unacceptable in any degree. If the action produces an As stated above, each box in FIG. 7 can represent not only an action but also a context that is opened by the action. (Though it is assumed here that each action opens a context, this, of course, not necessarily be the case; some actions may not open a context, as explained above.) After each context is opened, information regarding changes in configuration data is added to the context as long as program control remains in that action at that hierarchical level. If a new action is called within an action, a new context is opened and changes in configuration data are added to that context until program control shifts out of that action, or to an action at a lower hierarchical level.

Returning to FIG. 5, if a "succeed" statement is issued, the information in the context associated with the action just completed is copied to the context associated with the action to which program control is returned, as shown by step 511, thereby updating that context to reflect the acceptance (to this point) of the changes in data values that have occurred. (If the program 700 is terminating, the current configuration is accepted as the final configuration.) This is illustrated by, for instance, the relationship between the actions represented by boxes 703 and 709. In other words, assuming that a "succeed" statement is executed in the action of box 709 and all the actions below that action in the hierarchy, all of the changes in configuration data made by those actions will be added to the context associated with box 703. Likewise, if a "succeed" statement is executed in the action of box 710 and all actions lower in the hierarchy, all of the changes in configuration data made by those actions are added to the context associated with box 703. Note that if, subsequent to the exit from actions 709 and 710, a "fail" statement is executed in the action of box 703, all of the changes in the context associated with box 703 are undone, including those changes associated with the actions of boxes 709, 710 and other actions beneath them in the hierarchy. Thus, despite the fact that the contexts associated with those actions have been closed, the contexts are still open in the sense that they have become part of the context associated with box 703. Note further, however, that execution of a "fail" statement in the action of box 711 does not undo the changes associated with the actions of boxes 709 and 710, since the action of box 711 is not above those boxes in the hierarchy. A "fail" in the action of box 711 merely undoes the changes in configuration data associated with box 711.

Alternatively, if a "fail" statement is issued, the information in the context is used to restore the data values (including lists) that existed when the just completed action began, as shown by step 512. Any objects created during the action are deleted. Any objects deleted during the action are created. Any objects that were both created and deleted during the action are permanently destroyed.

The history data is also restored to the state existing at the beginning of the action. Associated with a side effect are 2 C++ functions: retract and assert. When a side effect fires, the retract function retracts old history values (i.e., values existing at the beginning of the action) and the assert function asserts new history values (i.e., values added since the beginning of the action). When a context is used to restore the configuration data after a "fail" command, the retract function retracts the new history values and the assert function asserts the old history values.

After restoration of the configuration data to the state existent at the beginning of the action, the action is complete, as shown by step 513. Note that changes in data values once accepted in step 511 may later be undone if an action at a higher level in the hierarchy issues a "fail" statement.

Contexts can also be used to create a variety of "what-if" scenarios. This can be accomplished by using a "leave" statement. The "leave" statement is used in place of a "succeed" or "fail" statement to exit actions. The "succeed" or "fail" statements cause the context for each action to disappear: either the context is used to restore the configuration data existent at the end of the action ("fail" statement) or the context data is copied into the context data of the action that called the action being exited ("succeed" statement). The "leave" statement does neither of these things; rather, the "leave" statement causes the context data to be saved after the action is exited. Consequently, the context data can be used to restore the configuration data as existent at the end of the action, even after another action has continued executing. Successive "leave" statements can be used to move between various states of the model, each state represented by the configuration data existent at the end of an action.

This process of opening and closing contexts as actions begin and end, and updating configuration data values based upon the data in the context and the success of the action, is know as "net change management". Net change management is used to effortlessly control the state of the program data at various points in the execution of the program using contexts to manage changes in data values. In one embodiment of the invention, net change management occurs automatically, relieving the developer of the burden of creating lengthy and complicated computer code to accomplish this task, as has previously been the case. For example, where the model implements constraint-based iterative repair, the program automatically updates the current state of the configuration data based upon the determination of the schedule score and the violation of hard constraints made at the end of execution of each action.

As indicated above, the data stored in a history data element can be accessed in a variety of ways to obtain different information regarding the history. In one embodiment, AML uses C++ functions to implement various functions for accessing the information in histories. Some of these functions are illustrated in Example 18 immediately below. Most of the functions are self-explanatory; their action can be understood from the AML function name (completely capitalized). The list of functions in Example 18 is not exhaustive, but merely illustrates the possibilities for accessing the data in histories.

EXAMPLE 18 cpp_function float GET_END_OF_HISTORY_VALUE (history<float>) "cpp_get_end_of_history_value";
cpp_functionint QUANTITY_OF_HISTORY_EXISTS (history<float>, float, date, date) "cpp_quantity_of_history_exists";
cpp_function int QUANTITY_OF_HISTORY_EXCEEDS (history<float>, int, date, date) "cpp_quantity_of_history_exceeds";
cpp_functionfloatMAX_QUANTITY_OVERALLOCATED (history<float>, date, date) "cpp_max_quantity_overallocated";
cpp_function void GET_OVERALLOCATED_CHANGERS (oset[instance<Spl_Class>], history<float>, date, date) "cpp_get_overallocated_changers";
cpp_function date NEXT_TIME_TO_TRY (history<float>, instance<Spl_Class>, float, date, int, int, time, date) "cpp_next_time_to_try";
cpp_function date STATE_NEXT_TIME_TO_TRY (history<string>, history<string>, string, int, date, int, time, date) "cpp_state_next_time_to_try";
cpp_function float GET_HISTORY_VALUE (history<float>, date)

```
"cpp_get_history_value";
cpp_function float AREA_UNDER_CURVE (history<float>, date, date)
"cpp_get_availability";
cpp_function void MOST_OVERALLOCATED_CHANGERS
(oset[instance<Spl_Class>, history<float>, date, date)
"cpp_most overallocated_changers";
cpp_function float GET_INITIAL_AMOUNT (history<float>)
"cpp_get_initial amount";
cpp_function void ANALYZE_HISTORY (history<float>, history<float>,
oset[int]) "cpp_analyze_history";
cpp_function int STATE_EXISTS (history<string>, string, date, date)
"cpp_state exists";
cpp_function date NEXT_LEGAL_CALENDAR_TIME (history<string>, date,
date) "cpp_next_legal_calendar_time";
cpp_function date IS_LEGAL_CALENDAR_TIME_FOR_SPLITTING
(history<string>, date, int) "cpp_is_legal_calendar_time_for_splitting";
cpp_function date PREVIOUS_LEGAL_CALENDAR_TIME (history<string>,
date, date) "cpp_previous_legal_calendar_time";
cpp_function int TIME_BETWEEN_TWO_POINTS_FOR_CALENDAR
(history<string>, date, date) "cpp_time_between two_points for_calendar";
cpp_function date DATE_FROM_CALENDAR_OFFSET (history<string>, date,
int, date) "cpp date_from_calendar_offset";
cpp_function date NEXT_CALENDAR_BREAK (history<string>, date)
"cpp_next_calendar_break";
cpp_function date PREVIOUS_CALENDAR_BREAK (history<string>, date)
"cpp_previous_calendar_break";
cpp_function void ADD_TO_HISTORY_VALUE_ON_CALENDAR
(history<float>, history<string>, float)"cpp_add to_history_value on_calendar";
cpp_function void GET_INVENTORY_AREAS (oset[date], oset[date], oset[float],
history<float>, date, date) "cpp_get_inventory_areas";
cpp_function int NUMBER_OF_AREAS_SHORT (history<float>, date, date,
float) "cpp_number of_areas_short";
cpp_function date GET_DATE_OF_NEXT_NEGATIVE_VALUE(history<float>,
date, date) "cpp_get_date of_next_negative value";
cpp_function date GET_DATA_OF_PREVIOUS_NOT_ENOUGH (history<float>,
float, date, date) "cpp_get_date_of previous_not_enough";
cpp_function void ADD_TO_HISTORY_VALUE (history<float>, float)
"cpp_add_to_history_value";
cpp_function void GET_ALLOCATED_CHANGERS (oset[instance<Spl_Class>],
history<float>, date, date) "cpp_get_allocated changers";
```

As can be appreciated from the description above, the invention enables an enterprise—even a complex enterprise—to be modeled rapidly and easily, frequently enabling the modeling to be completed in days or weeks. The invention also simplifies the process of translating a detailed specification into a language that can be understood by a computer so that the translation into a computer language necessitates a lower level of computer literacy (making the model development process more accessible) and requires fewer man-hours (making the process cheaper). Further, the invention enables a computer model of an enterprise to be developed with less computer code (and, therefore, fewer mistakes) than has previously been the case, thereby making the computer model cheaper and easier to develop and maintain. The invention also enables a model of an enterprise to be developed in such a manner that all of the personnel of the development team (e.g., managers and programmers) are more fully integrated into the entire development process. Thus, computer models are obtained more quickly and efficiently, and, as a consequence, there is an increased inclination to develop more robust models, thereby enhancing the effectiveness of the model as a tool. Additionally, a modeling language according to the invention includes data constructs that can be used to restore various configurations of the modeled enterprise during operation of a program modeling the enterprise and that eliminate the need for the model developer to be concerned with tracking and maintenance of changing data describing the configuration of the modeled enterprise.

Various embodiments of the invention have been described. The descriptions are intended to be illustrative, not limitative. Thus, it will be apparent to one skilled in the art that certain modifications may be made to the invention as described without departing from the scope of the claims set out below. For example, though aspects of the invention have been described as they apply to the development and use of a scheduling system, the invention can be applied to modeling of any enterprise that involves the management of a large amount of information or any enterprise which requires a large amount of information for description of the enterprise. For example, the invention can be used to develop enterprise models for use in simulation, decision support, control systems analysis, CAD automation and sales order configuration.

We claim:

1. A method for dynamically modeling an enterprise, each state of the enterprise being modeled by a set of configuration data, the modeled enterprise having an initial state at the beginning of the method and a final state at the end of the method, the method comprising the steps of:

storing an initial set of configuration data representing the initial state;

performing one or more operations that change the state of the modeled enterprise;

for each of one or more of the operations, storing context data representing changes between a first set of configuration data representing a first state of the modeled enterprise at the beginning of the operation and a second set of configuration data representing a second state of the modeled enterprise at the end of the operation;

after each step of storing context data, testing the corresponding second set of configuration data, using a set of predetermined conditions, to determine whether the second set of configuration data conforms to the predetermined conditions;

after each step of testing, selecting a current set of configuration data, the step of selecting further comprising the steps of:
  if the second set of configuration data does not conform to the predetermined conditions, restoring the first set of configuration data using the context data and choosing the first set of configuration data as the current set of configuration data; and
  if the second set of configuration data does conform to the predetermined conditions, choosing the second set of configuration data as the current set of configuration data; and establishing the current set of configuration data at the final state as a final set of configuration data.

2. A method as in claim 1, wherein each step of storing context data further comprises the steps of:
  for each of the configuration data that changes value between the first state and the second state, storing the value of the configuration data at the first state;
  storing information identifying added configuration data that is part of the second set of configuration data, but not part of the first set of configuration data;
  storing information identifying deleted configuration data that is part of the first set of configuration data, but not part of the second set of configuration data; and
  storing information identifying side effects that have fired after the beginning of the operation.

3. A method as in claim 2, wherein:
  the configuration data includes objects;
  the step of storing information identifying added configuration data further comprises storing information identifying classes and instances of objects that are added to the configuration data by the change from the first state to the second state; and
  the step of storing information identifying deleted configuration data further comprises storing information identifying classes and instances of objects that are deleted from the configuration data by the change from the first state to the second state.

4. A method as in claim 1, further comprising the step of storing the context data after each step of selecting a current set of configuration data.

5. A method as in claim 1, wherein:
  the configuration data includes a plurality of data types, the plurality of data types including a first data type that enables maintenance of a record of the value of data of a second data type over a specified period of time;
  when the value of an element of configuration data of the second data type changes value, an update procedure is initiated that causes the value of an element of configuration data of the first type to be changed to reflect the change in the record, the update procedure including one or more steps;
  the step of storing context data further comprises the step of storing a pointer to each update procedure; and
  the step of restoring further comprises the step of performing one or more restoration procedures, each restoration procedure including one or more steps that reverse the effect of the steps of a corresponding update procedure, so that the value of element of configuration data of the first type is returned to the value at the first state.

6. A method as in claim 1, wherein:
  the configuration data includes a data type that specifies a list of values; and
  the step of restoring further comprises the step of performing one or more restoration procedures to return each data type storing a list of values to the values at the first state.

7. A method for dynamically modeling an enterprise, comprising the steps of:
  storing context data representing changes between a first set of configuration data representing a first state of the modeled enterprise and a second set of configuration data representing a second state of the modeled enterprise;
  testing the second set of configuration data, using a set of predetermined conditions, to determine whether the second set of configuration data conforms to the predetermined conditions; and
  selecting a current set of configuration data, the step of selecting further comprising the steps of:
    if the second set of configuration data does not conform to the predetermined conditions, restoring the first set of configuration data using the context data and choosing the first set of configuration data as the current set of configuration data; and
    if the second set of configuration data does conform to the predetermined conditions, choosing the second set of configuration data as the current set of configuration data.

8. A method as in claim 7, wherein the step of storing further comprises the steps of:
  for each of the configuration data that changes value between the first state and the second state, storing the value of the configuration data at the first state;
  storing information identifying added configuration data that is part of the second set of configuration data, but not part of the first set of configuration data; and
  storing information identifying deleted configuration data that is part of the first set of configuration data, but not part of the second set of configuration data; and
  storing information identifying side effects that have fired after the beginning of the operation.

9. A method as in claim 8, wherein:
  the configuration data includes objects;
  the step of storing information identifying added configuration data further comprises storing information identifying classes and instances of objects that are added to the configuration data by the change from the first state to the second state; and
  the step of storing information identifying deleted configuration data further comprises storing information identifying classes and instances of objects that are deleted from the configuration data by the change from the first state to the second state.

10. A method as in claim 7, wherein the steps of storing, testing and selecting are performed sequentially a plurality of times.

11. A method as in claim 10, further comprising the step of storing the context data after each step of selecting.

12. A method as in claim 7, wherein:
  the first state is defined by a first set of conditions specified by a user; and
  the second state is defined by a second set of conditions specified by the user.

13. A method as in claim 7, wherein:
the model of the enterprise includes one or more operations for changing the state of the modeled enterprise; and
the first and second states correspond to the state of the modeled enterprise at the beginning of an operation and at the end of an operation, respectively.

14. A method as in claim 7, wherein:
the configuration data includes a plurality of data types, the plurality of data types including a first data type that enables maintenance of a record of the value of data of a second data type over a specified period of time;
when the value of an element of configuration data of the second data type changes value, an update procedure is initiated that causes the value of an element of configuration data of the first type to be changed to reflect the change in the record, the update procedure including one or more steps;
the step of storing further comprises the step of storing a pointer to each update procedure; and
the step of restoring further comprises the step of performing one or more restoration procedures, each restoration procedure including one or more steps that reverse the effect of the steps of a corresponding update procedure, so that the value of element of configuration data of the first type is returned to the value at the first state.

15. A method as in claim 7, wherein:
the configuration data includes a data type that specifies a list of values; and
the step of restoring further comprises the step of performing one or more restoration procedures to return each data type storing a list of values to the values at the first state.

16. A system for dynamically modeling an enterprise, each state of the enterprise being modeled by a set of configuration data, the modeled enterprise having an initial state at the beginning of the method and a final state at the end of the method, comprising:
means for storing an initial set of configuration data representing the initial state;
means for performing one or more operations that change the state of the modeled enterprise;
means for storing context data associated with each of one or more of the operations, the context data representing changes between a first set of configuration data representing the state of the modeled enterprise at the beginning of the operation and a second set of configuration data representing the state of the modeled enterprise at the end of the operation;
means for testing the corresponding second set of configuration data, using a set of predetermined conditions, to determine whether the second set of configuration data conforms to the predetermined conditions;
means for selecting a current set of configuration data after each operation, wherein:
if the second set of configuration data does not conform to the predetermined conditions, the first set of configuration data is restored using the context data and chosen as the current set of configuration data; and
if the second set of configuration data does conform to the predetermined conditions, the second set of configuration data is chosen as the current set of configuration data; and
means for establishing the current set of configuration data at the final state as a final set of configuration data.

17. A system for dynamically modeling an enterprise, each state of the enterprise being modeled by a set of configuration data, the modeled enterprise having a first state at the beginning of the method that is represented by a first set of configuration data and a second state at the end of the method that is represented by a second set of configuration data, comprising:
means for storing context data representing changes between the first set of configuration data and the second set of configuration data;
means for testing the second set of configuration data, using a set of predetermined conditions, to determine whether the second set of configuration data conforms to the predetermined conditions; and
means for selecting a current set of configuration data, wherein:
if the second set of configuration data does not conform to the predetermined conditions, the first set of configuration data is restored using the context data and chosen as the current set of configuration data; and
if the second set of configuration data does conform to the predetermined conditions, the second set of configuration data is chosen as the current set of configuration data.

18. A computer readable medium encoded with one or more computer programs for enabling dynamic modeling of an enterprise, comprising:
instructions for storing context data representing changes between a first set of configuration data representing a first state of the modeled enterprise and a second set of configuration data representing a second state of the modeled enterprise;
instructions for testing the second set of configuration data, using a set of predetermined conditions, to determine whether the second set of configuration data conforms to the predetermined conditions; and
instructions for selecting a current set of configuration data, the instructions for selecting further comprising:
instructions for, if the second set of configuration data does not conform to the predetermined conditions, restoring the first set of configuration data using the context data and choosing the first set of configuration data as the current set of configuration data; and
instructions for, if the second set of configuration data does conform to the predetermined conditions, choosing the second set of configuration data as the current set of configuration data.

* * * * *

UNITED STATES PATENT AND TRADEMARK OFFICE
CERTIFICATE OF CORRECTION

PATENT NO.   : 5,768,586
DATED        : June 16, 1998
INVENTOR(S)  : Zweben et al.

It is certified that error appears in the above-identified patent and that said Letters Patent is hereby corrected as shown below:

<u>Title page,</u>
Item [56], References Cited, U.S. PATENT DOCUMENTS, after
"5,649,190  7/1997  Sarif-Askary et al. . . . . . . . . . . . . . . . . . . . . . . 395/612" insert
-- 4,495,559  1/1985  Gelatt, Jr. et al. . . . . . . . . . . . . . . . . . . . . . . 364/148
   4,864,507  9/1989  Ebling et al. . . . . . . . . . . . . . . . . . . . . . . . . 364/149
   4,874,963  10/1989  Alspector . . . . . . . . . . . . . . . . . . . . . . . . . . 307/201
   4,931,944  6/1990  Richter et al. . . . . . . . . . . . . . . . . . . . . . . . . 364/468
   5,255,345  10/1993  Shaefer . . . . . . . . . . . . . . . . . . . . . . . . . . . . 385/13
   5,303,328  4/1994  Masui et al. . . . . . . . . . . . . . . . . . . . . . . . . .  395/23

FOREIGN PATENT DOCUMENTS 6-162041        10/1994         Japanese Patent Office

OTHER PUBLICATIONS

M. Zweben et al., "Learning to improve constraint-based scheduling", Artificial Intelligence 58, Elsevier Science Publishers B.V., 1992, pp. 271-296.
M. Zweben et al., "Scheduling and Rescheduling with Iterative Repair", IEEE Transactions on Systems, Man. and Cybernetics, Vol. 23, No. 6, November/December 1993, pp. 1588-1595.
M. Zweben et al., "Heuristics versus Lookahead in Iterative Repair Scheduling", IEEE Transactions on Systems, Man. and Cybernetics, Vol. 23, No. 6, November/December 1993.
M. Zweben et al., "Scheduling and Rescheduling with Iterative Repair", <u>Intelligent Scheduling, Chapter 8</u>, Morgan Kaufmann Publishers, 1994, pp. 241-255.
M. Zweben et al., "The Space Shuttle Ground Processing Scheduling System", <u>Intelligent Scheduling, Chapter 15</u>, Morgan Kaufmann Publishers, 1994, pp. 423-449. --

UNITED STATES PATENT AND TRADEMARK OFFICE
CERTIFICATE OF CORRECTION

PATENT NO. : 5,768,586
DATED : June 16, 1998
INVENTOR(S) : Zweben et al.

It is certified that error appears in the above-identified patent and that said Letters Patent is hereby corrected as shown below:

Column 4,
Line 65, delete "s" and substitute -- is --;

Column 5,
Line 9, after "5" insert -- is --;
Line 14, after "7" insert -- is --;
Line 43, delete "maintenance" and substitute -- Maintenance--;

Column 19,
Line 63, delete "he" and substitute -- the --.

Signed and Sealed this

Tenth Day of September, 2002

Attest:

Attesting Officer

JAMES E. ROGAN
*Director of the United States Patent and Trademark Office*